(12) United States Patent
Mori et al.

(10) Patent No.: US 7,805,722 B2
(45) Date of Patent: Sep. 28, 2010

(54) SOFTWARE INSTALL PROGRAM PRODUCT, INSTALLATION METHOD, AND SOFTWARE INSTALL SYSTEM

(75) Inventors: Hiromi Mori, Nagoya (JP); Tomohiro Suzuki, Moriyama-ku (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1380 days.

(21) Appl. No.: 10/935,133

(22) Filed: Sep. 8, 2004

(65) Prior Publication Data

US 2005/0066325 A1 Mar. 24, 2005

(30) Foreign Application Priority Data

Sep. 18, 2003 (JP) ............... 2003-326248

(51) Int. Cl.
- *G06F 9/44* (2006.01)
- *G06F 9/445* (2006.01)
- *G06F 15/177* (2006.01)

(52) U.S. Cl. .............. 717/178; 717/173; 709/220

(58) Field of Classification Search ......... 717/168–178; 709/220–223
See application file for complete search history.

(56) References Cited

U.S. PATENT DOCUMENTS

| 5,579,509 | A  | * | 11/1996 | Furtney et al. ............. 717/170 |
| 5,742,829 | A  | * | 4/1998  | Davis et al. ................ 717/178 |
| 5,881,236 | A  | * | 3/1999  | Dickey ....................... 717/176 |
| 5,966,540 | A  | * | 10/1999 | Lister et al. ................ 717/174 |
| 6,389,589 | B1 | * | 5/2002  | Mishra et al. .............. 717/170 |
| 6,412,082 | B1 | * | 6/2002  | Matsuura .................... 714/38 |
| 6,418,555 | B2 | * | 7/2002  | Mohammed ................ 717/169 |
| 6,792,452 | B1 | * | 9/2004  | Philyaw ..................... 709/217 |
| 6,950,964 | B1 | * | 9/2005  | McMichael et al. .......... 714/38 |
| 7,058,563 | B1 | * | 6/2006  | Chrysanthakopoulos et al. .................... 717/176 |
| 7,251,812 | B1 | * | 7/2007  | Jhanwar et al. ............. 717/171 |
| 7,304,758 | B2 | * | 12/2007 | Ferlitsch .................... 717/170 |
| 7,631,054 | B2 | * | 12/2009 | French et al. ............... 709/220 |
| 2002/0129353 | A1 | * | 9/2002 | Williams et al. ............ 717/175 |
| 2003/0037325 | A1 | * | 2/2003 | Hargrove et al. ............ 717/175 |

(Continued)

FOREIGN PATENT DOCUMENTS

JP A 7-219747 8/1995

(Continued)

*Primary Examiner*—Wei Y Zhen
*Assistant Examiner*—Ryan D Coyer
(74) *Attorney, Agent, or Firm*—Oliff & Berridge, PLC

(57) ABSTRACT

A software install program product causes a computer to execute: acquiring version information of an operating system used with the computer; acquiring compatible OS information of the software program stored in the recording medium; determining whether or not the operating system is a compatible operating system corresponding to the compatible OS information based on the compatible OS information and the version information; determining that the software program can be installed in the computer if determined that the operating system is the compatible operating system; acquiring location information stored in the recording medium if determined that the operating system is not the compatible operating system; accessing a database server on a network based on the location information; acquiring installation information stored in the database server; determining whether or not the software program can be installed in the computer based on the installation information; and installing the software program into the computer if determined that the software program can be installed in the computer.

10 Claims, 8 Drawing Sheets

U.S. PATENT DOCUMENTS

| | | | |
|---|---|---|---|
| 2003/0084437 A1* | 5/2003 | Cashin et al. | 717/174 |
| 2003/0135668 A1* | 7/2003 | Abe | 717/178 |
| 2003/0159135 A1* | 8/2003 | Hiller et al. | 717/166 |
| 2004/0044996 A1* | 3/2004 | Atallah | 717/169 |

FOREIGN PATENT DOCUMENTS

| | | |
|---|---|---|
| JP | A 11-296325 | 10/1999 |
| JP | A 2000-353079 | 12/2000 |

* cited by examiner

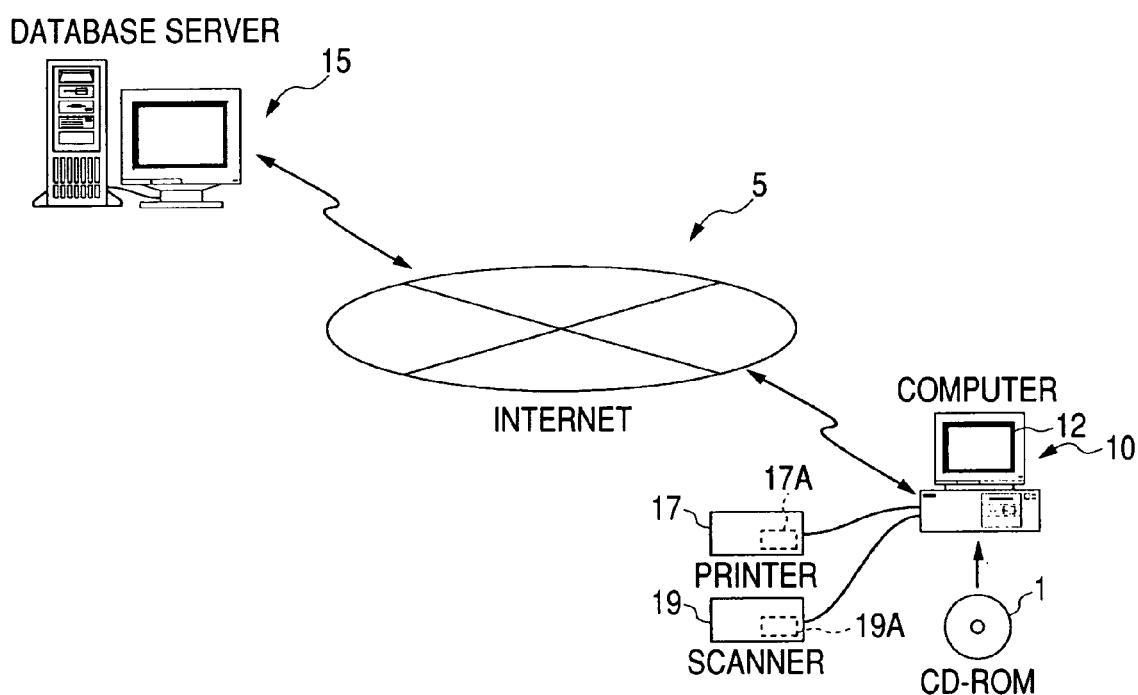

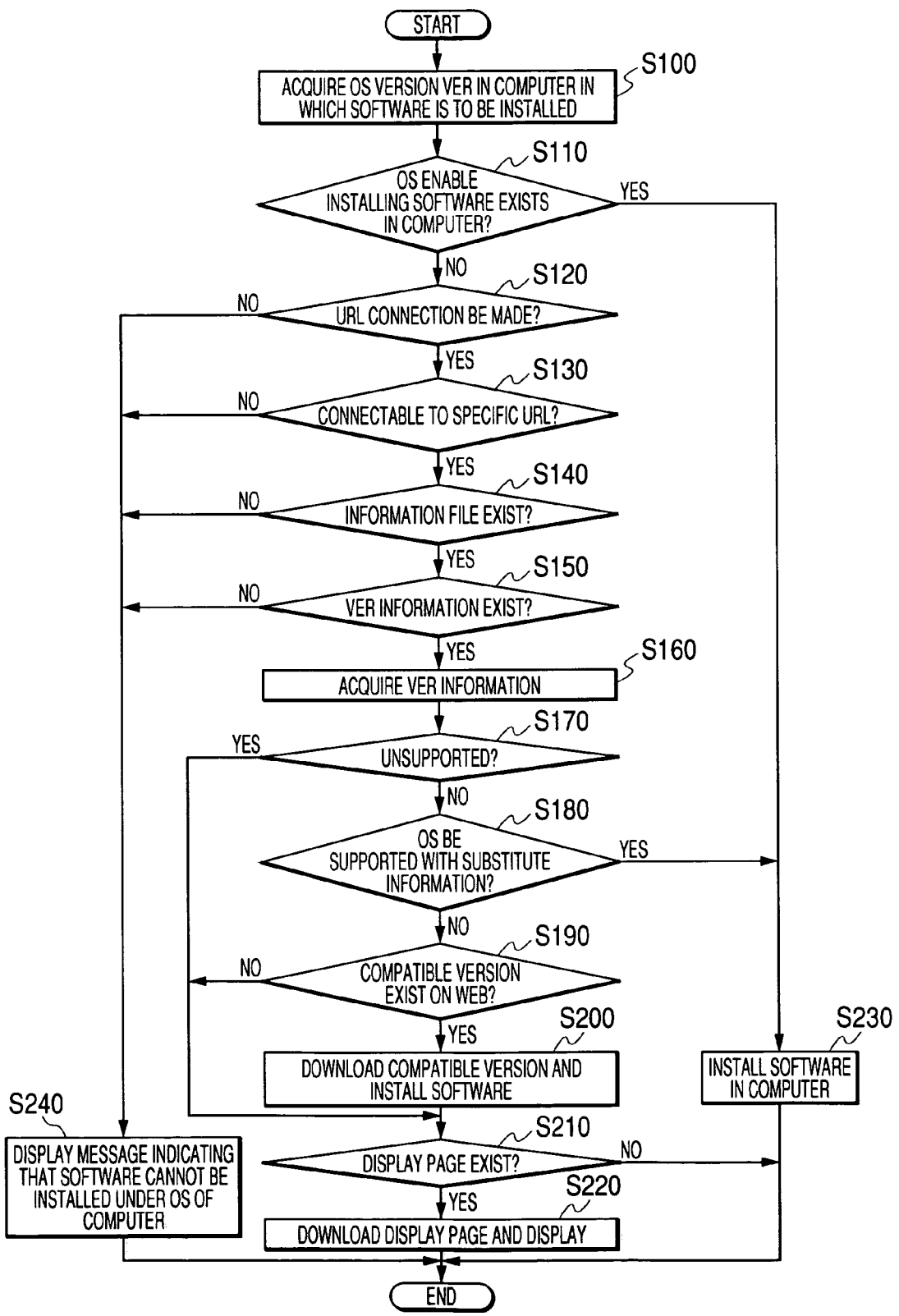

FIG. 6

YOUR PC OPERATING SYSTEM IS NOT SUPPORTED WITH THE CD-ROM.
WILL YOU CONNECT YOUR COMPUTER TO THE INTERNET AND CONTINUE INSTALLING THE SOFTWARE?

[YES]  [NO]

COMPATIBLE OPERATING SYSTEMS
OS1, OS2, OS3, OS4

FIG. 7

YOUR PC OPERATING SYSTEM IS NOT SUPPORTED WITH THE CD-ROM.
SEE THE MOST RECENT INFORMATION ON THE WEB HOME PAGE.

[URL LINK]  [CANCEL]

COMPATIBLE OPERATING SYSTEMS
OS1, OS2, OS3, OS4

FIG. 8A

```
INSTALLER VERSION 1.0
Model = xxxxx
[OS1 Ver. 5.0]
    INSTALL: OS1 Ver 4.0
    DISPLAY: URL1
[OS1 Ver. 5.1]
    INSTALL: NG
    DISPLAY: URL2
[OS1 Ver. 5.2]
    INSTALL: URL3
    DISPLAY: URL4
```

FIG. 8B

```
CopyFile
    [File 1]
        COPY DESTINATION: WINDIR
        Menu: AAA
    [File 2]
        COPY DESTINATION: DEFAULT
        Menu: BBB
```

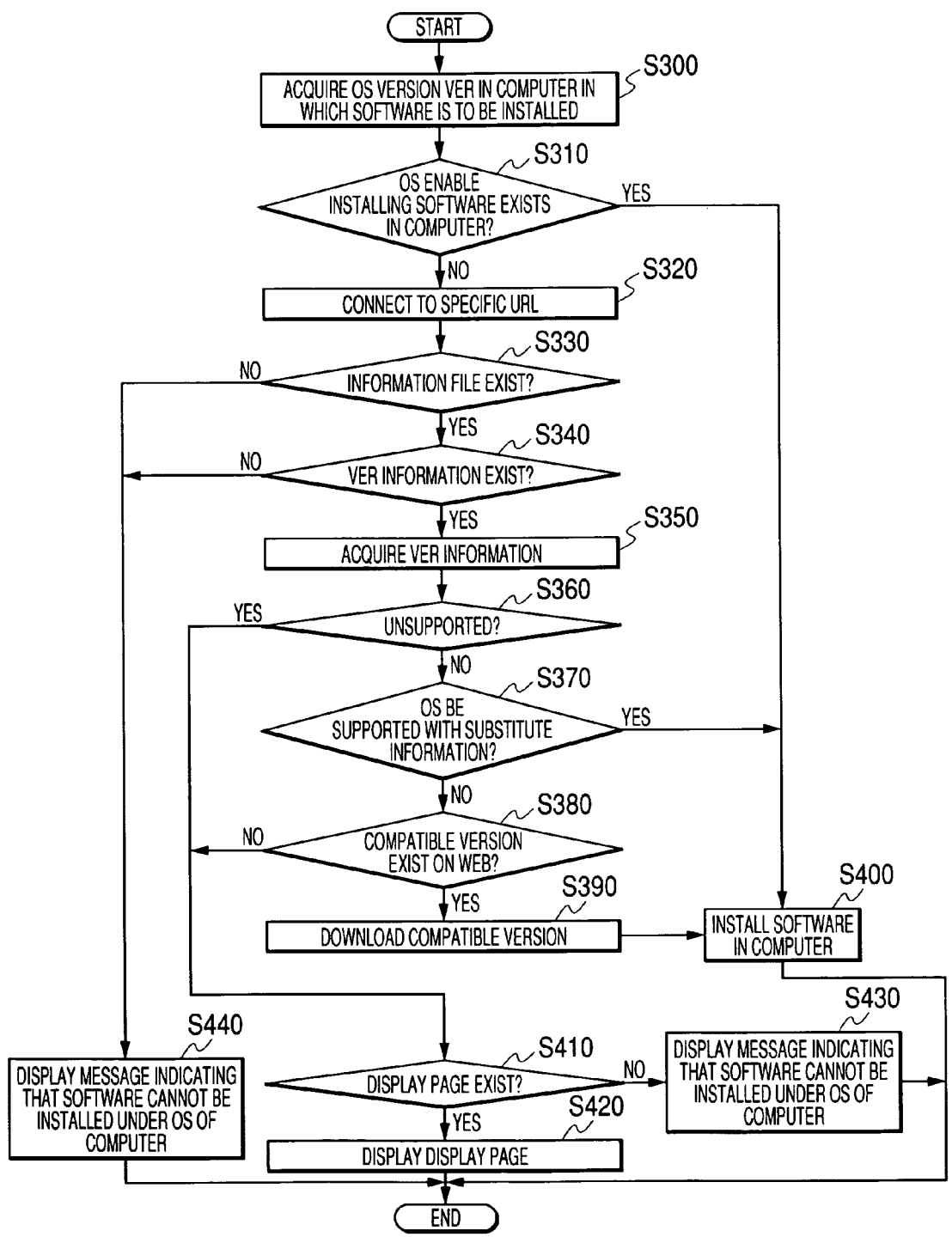

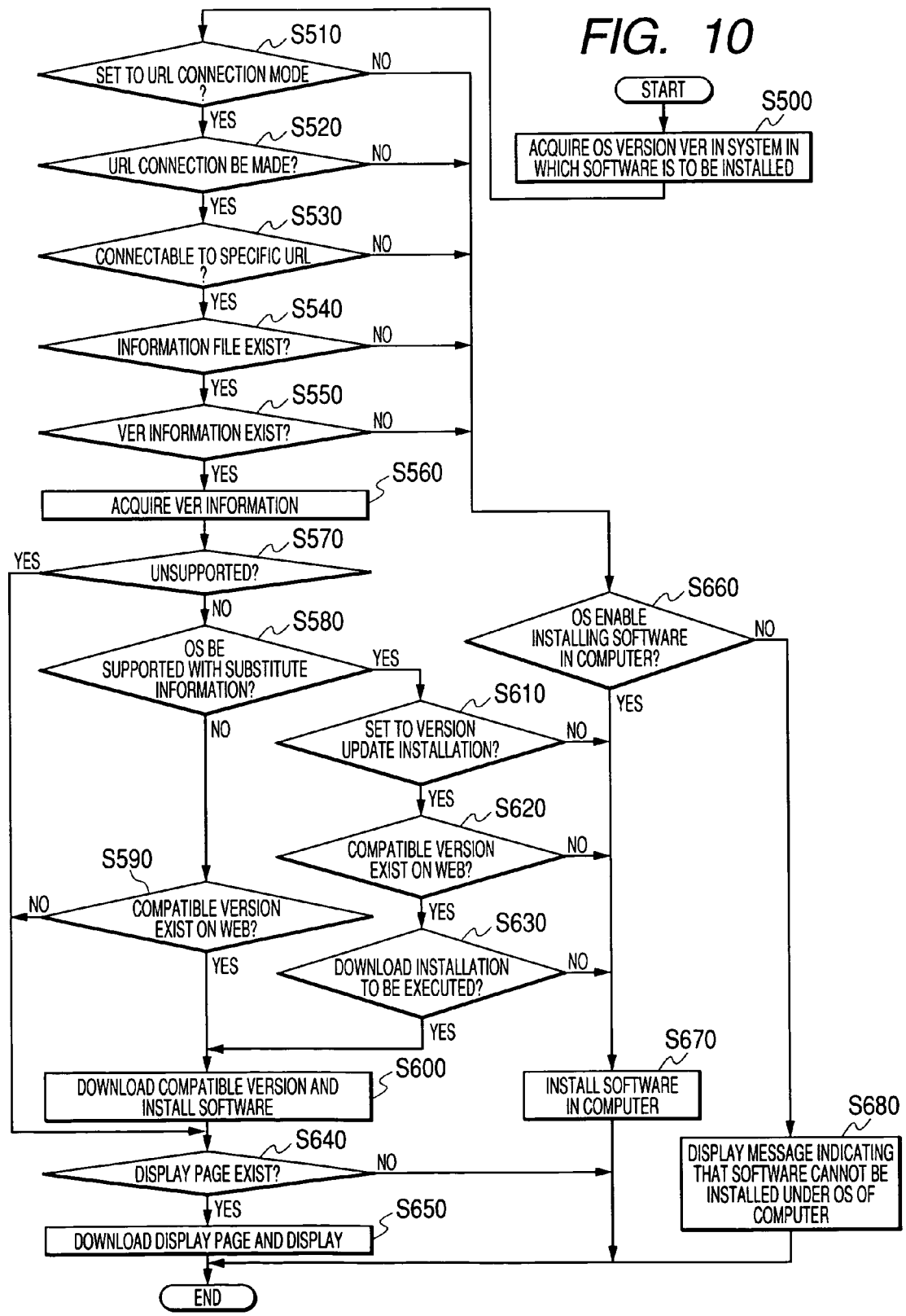

SOFTWARE INSTALL PROGRAM PRODUCT, INSTALLATION METHOD, AND SOFTWARE INSTALL SYSTEM

BACKGROUND OF THE INVENTION

1. Field of the Invention

The present invention relates to a software install program product for installing software program recorded on a recording medium into a computer, an installation method, and a software install system.

2. Description of the Related Art

Hitherto, to install software recorded on a recording medium such as a CD-ROM, the operating system (OS) compatible with the install software has been predetermined at the releasing time of the recording medium (or the install software), and for example, in installing the software, the OS operating in the computer in which the software is to be installed has been inquired and the software corresponding to the OS has been installed in the computer using an installation operation information fitted for the OS.

For example, in JP-A-7-219747, the computer (computer system) receives inquiry about the OS version information and the installation operation means corresponding to the OS version is selected based on the provided version information. The selected installation operation means selects and executes the command and software modules appropriate for the version to perform installation operation.

SUMMARY OF THE INVENTION

However, in the configuration in the related art, there is a problem that the recording medium (or the install program) can be configured so as to support the already released OSs, but cannot cover later released OSs. That is, what kind of OS will be later released cannot be imagined at the manufacturing time of the recording medium (or the install program) As measures that can be taken, if the software (recording medium) is not compatible with the later released OS, it is possible that installing the software is discontinued or is executed.

However, if the method of discontinuing installing the software is adopted, when the software (recording medium) is not compatible with the later released OS, it becomes impossible to install the software (recording medium) and it becomes necessary for the user to obtain a new product (recording medium) by purchasing the product. In this case, if information in the recording medium can be used, installing the software is discontinued and therefore the possibility that a load will be put on the user is increased. In contrast, if the method of carrying out installing the software is adopted, it is feared that the computer may malfunction.

It is therefore one of objects of the invention to provide a configuration and a method, when software recorded on a computer-readable recording medium is installed in a computer according to an install program recorded on the computer-readable recording medium, for making it possible to take appropriate measures without causing a problem to occur when the operating system of the computer in which the software is to be installed is not supported with information previously recorded on the recording medium.

According to a first aspect of the invention, there is provided a software install program product for installing a software program recorded on a computer-readable recording medium into a computer, the program product for causing the computer to execute: acquiring version information of an operating system used with the computer; acquiring compatible OS information of the software program stored in the recording medium; determining whether or not the operating system is a compatible operating system corresponding to the compatible OS information based on the compatible OS information and the version information; determining that the software program can be installed in the computer if determined that the operating system is the compatible operating system; acquiring location information stored in the recording medium if determined that the operating system is not the compatible operating system; accessing a database server on a network based on the location information; acquiring installation information stored in the database server; determining whether or not the software program can be installed in the computer based on the installation information; and installing the software program into the computer if determined that the software program can be installed in the computer.

According to a second aspect of the invention, there is provided a software install program product installing a software program recorded on a computer-readable recording medium into a computer, the program product for causing the computer to execute: acquiring version information of an operating system used with the computer; acquiring location information stored in the recording medium; accessing a database server on a network based on the location information; acquiring compatible OS information stored in the database server; determining whether or not the software program can be installed in the computer based on the compatible OS information and the version information; and installing the software program into the computer if determined that the software program can be installed in the computer.

According to a third aspect of the invention, there is provided an installation method for installing a software program recorded on a computer-readable recording medium into a computer according to an install program recorded on the recording medium, the installation method including: acquiring version information of an operating system used with the computer; acquiring compatible OS information of the software program stored in the recording medium; determining whether or not the operating system is a compatible operating system corresponding to the compatible OS information based on the compatible OS information and the version information; determining that the software program can be installed in the computer if determined that the operating system is the compatible operating system; acquiring location information stored in the recording medium if determined that the operating system is not the compatible operating system; accessing a database server on a network based on the location information; acquiring installation information stored in the database server; determining whether or not the software program can be installed in the computer based on the installation information; and installing the software program into the computer if determined that the software program can be installed in the computer.

According to a fourth aspect of the invention, there is provided an installation method for installing a software program recorded on a computer-readable recording medium into a computer according to an install program recorded on the recording medium, the installation method including: acquiring version information of an operating system used with the computer; acquiring location information stored in the recording medium; accessing a database server on a network based on the location information; acquiring compatible OS information stored in the database server; determining whether or not the software program can be installed in the computer based on the compatible OS information and the version information; and installing the software program into the computer if determined that the software program can be installed in the computer.

According to a fifth aspect of the invention, there is provided a software install system that installs a software program recorded on a computer-readable recording medium into a computer, the software install system including: an OS version acquisition unit that acquires version information of an operating system used with the computer; a compatible OS information acquisition unit that acquires compatible OS information of the software program stored in the recording medium; a compatibility check unit that determines whether or not the operating system is a compatible operating system corresponding to the compatible OS information based on the compatible OS information and the version information; a first determination unit that determines that the software program can be installed in the computer if determined that the operating system is the compatible operating system; a location information acquisition unit that acquires location information stored in the recording medium if determined that the operating system is not the compatible operating system; a communication unit that accesses a database server on a network based on the location information and acquires installation information stored in the database server; a second determination unit that determines whether or not the software program can be installed in the computer based on the installation information; and an installation unit that installs the software program into the computer if determined that the software program can be installed in the computer.

According to a sixth aspect of the invention, there is provided a software install system that installs a software program recorded on a computer-readable recording medium into a computer, the software install system including: an OS version acquisition unit that acquires version information of an operating system used with the computer; a location information acquisition unit that acquires location information stored in the recording medium; a communication unit that accesses a database server on a network based on the location information and acquires compatible OS information stored in the database server; a determination unit that determines whether or not the software program can be installed in the computer based on the compatible OS information and the version information; and an installation unit that installs the software program into the computer if determined that the software program can be installed in the computer.

BRIEF DESCRIPTION OF THE DRAWINGS

These and other objects and advantages of the present invention will become more fully apparent from the following detailed description taken with the accompanying drawings, in which:

FIG. 2 is a schematic drawing to schematically show the system configuration in FIG. 1;

FIG. 3 is a conceptual drawing to conceptually illustrate the data structure in a recording medium;

FIG. 5 is a flowchart to illustrate a processing flow of an install program according to the first embodiment of the invention;

FIG. 6 is a schematic drawing to illustrate information for prompting the user to answer a question;

FIG. 7 is a drawing to show a screen display example where the software cannot be installed;

FIGS. 8A and 8B are schematic representations to conceptually describe an example of installation information;

FIG. 9 is a flowchart to illustrate a processing flow of an install program according to a second embodiment of the invention; and FIG. 10 is a flowchart to illustrate a processing flow of an install program according to a third embodiment of the invention.

DETAILED DESCRIPTION OF THE PREFERRED EMBODIMENTS

Referring now to the accompanying drawings, a description will be given in detail of preferred embodiments of the invention.

First Embodiment

A first embodiment of the invention will be discussed with reference to FIGS. 1-8B.

The install program according to the first embodiment of the invention is recorded on a computer-readable recording medium and causes a computer to execute a plurality of process for installing software recorded on the recording medium in the computer. A CD-ROM 1 is adopted as the recording medium by way of example in the first embodiment. However, various record media can be used such as storage media read by a reader installed in or outside a computer for use, such as ROM, RAM, a magneto-optical disk, a flexible disk, and semiconductor memory. Any other recording medium may be adopted if the recording medium is a computer-readable recording medium.

Figure 1:
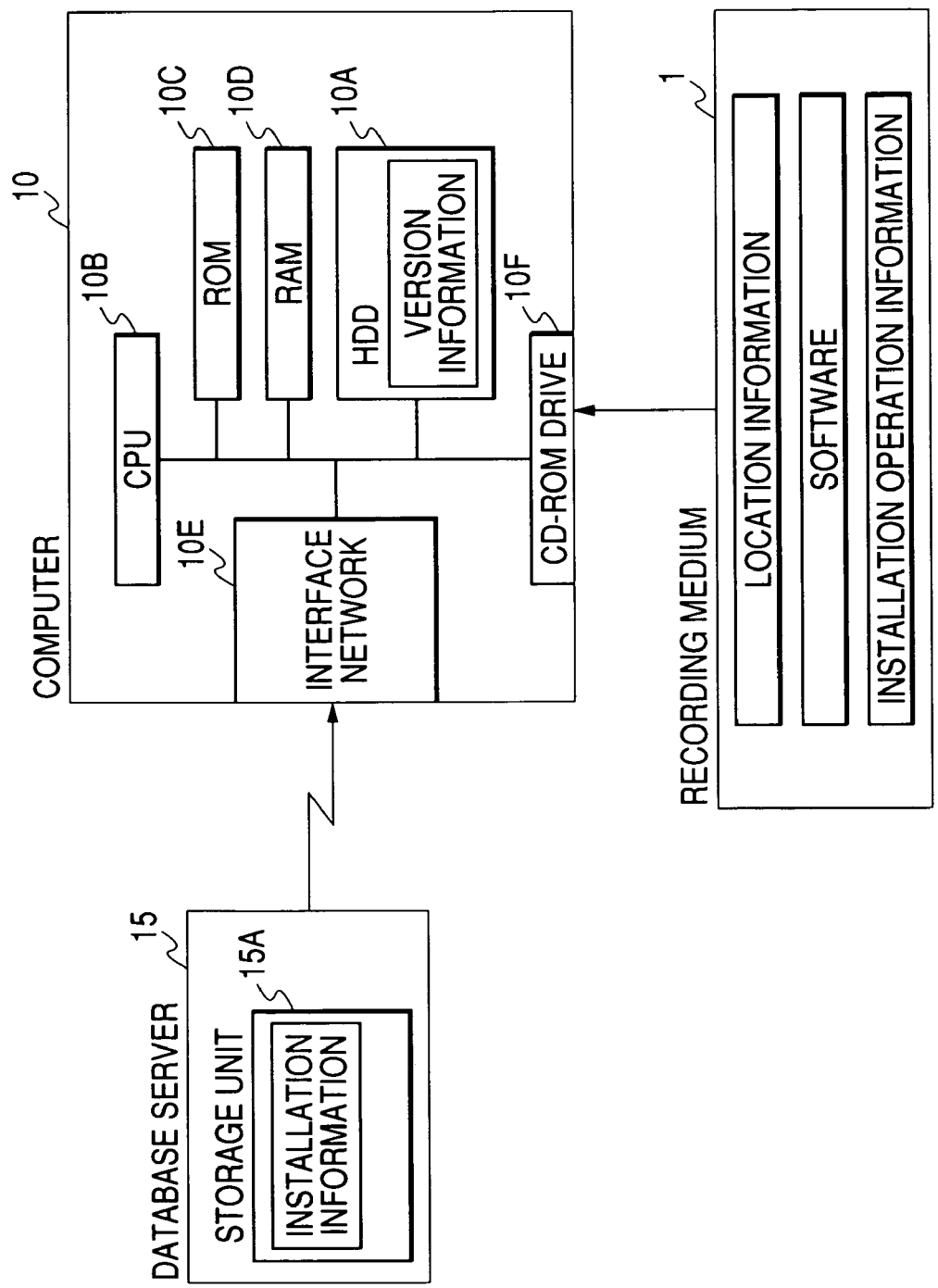
FIG. 1 is a block diagram to conceptually show the configuration of a system incorporating an install program according to a first embodiment of the invention.

A computer 10 in which software is to be installed includes a CD-ROM drive 10F as recording medium read means and can read information recorded on a recording medium (CD-ROM 1) and can also be connected to a database server 15 (described later) through a network such as Internet 5 illustrated in FIG. 2. Specifically, the computer 10 includes basic components such as a CPU 10B, ROM 10C, RAM 10D, and a network interface 10E including a modem and a LAN interface for network connection, and can access various sites on the Internet 5 through the network interface 10E. The computer 10 further includes a hard disk drive 10A (simply, HDD 10A) as storage unit in which an operating system (OS) for managing the computer 10 is stored. Various operating systems are available on the market and version information is provided for each type. FIG. 1 conceptually illustrates how the version information for enabling the operating system type to be determined is stored in the hard disk drive 10A.

In the embodiment, a printer driver or a scanner driver is taken as an example of software and the install program for installing the printer driver or the scanner driver in the computer 10 will be discussed.

Firstly, an outline of the embodiment will be discussed. The install program according to the embodiment causes the computer 10 to execute OS version acquisition processing of acquiring the version information of the operating system used with the computer 10 in which the software is to be installed and further causes the computer 10 to execute compatibility check processing of determining whether or not the operating system used with the computer 10 is a compatible operating system (namely, whether or not the operating system can be supported according to the already existing information recorded on the recording medium) based on the version information acquired by executing the OS version acquisition processing and compatible OS information recorded on the CD-ROM 1 of the recording medium.

The compatible OS information recorded on the recording medium may be information capable of determining the compatible OSs with the recording medium; it may be a part of program code, or may be provided as a list of compatible OSs. In the data structure example in FIG. 3, installation operation information (simply, operation information) and software corresponding to the versions of OSs are previously recorded on the CD-ROM 1 so as to able to support the versions of OSs. The OS to which operation information and software in the CD-ROM 1 do not correspond is assumed to be an incompatible OS.

The install program causes the computer 10 to execute the following determination processing: If the OS used with the computer 10 is a compatible OS, it is determined that the software recorded on the recording medium (namely, the CD-ROM 1) can be installed in the computer 10. On the other hand, if the OS used with the computer 10 is an incompatible OS, the database server 15 on the network is accessed based on the location information recorded on the recording medium (here, the URL of the database server 15 corresponds to the location information) and whether or not the software recorded on the recording medium can be installed in the computer 10 is determined based on the installation information stored in the database server 15 (S110, S130 to S150, S170 to S190 later described with reference to FIG. 5). If it is determined in the determination processing that the software recorded on the recording medium can be installed in the computer 10, installation processing of installing the software recorded on the recording medium (CD-ROM 1) in the computer 10 is performed. The database server 15 can adopt a similar hardware configuration to that of a generally used network server and can be implemented as a computer which includes a CPU, ROM, RAM, a network interface, etc., and can be connected to a network, for example, like the computer 10 although not shown. As storage unit 15A, a hard disk drive can be used appropriately as with the computer 10, but the storage unit 15A may be any other storage unit. In addition, any of various units, such as a recording medium reader of a CD-ROM drive, etc., can be installed as required.

Next, a specific processing flow of the install program having the features will be discussed with reference to the flowchart shown in FIG. 5.

When processing is started as the install program stored on the CD-ROM 1 is read, the computer 10 executes the above-described OS version acquisition processing at S100. The computer 10 acquires the version information of the OS used with the computer 10 by reading a part of OS program or data stored in the storage unit (hard disk drive 10A). The computer 10 determines whether or not the OS of the computer 10 is supported in the CD-ROM 1 (namely, whether or not the software can be installed in the computer 10 only with the information in the CD-ROM 1) based on the acquired OS version information and the compatible OS information recorded on the CD-ROM 1. S110 is a step forming a part of the determination processing.

At S110, if the OS of the computer 10 is determined a compatible OS, it is determined that the software can be installed in the computer 10 (YES at S110). Then, the process goes to S230 and the software stored on the CD-ROM 1 is installed using the operation information corresponding to the OS version recorded on the CD-ROM 1. For example, if Ver.5.0 of OS1 is used in the computer 10, the software for the version (software (NO.10)) is installed using the operation information corresponding to Ver.5.0 (operation information (NO.10)).

On the other hand, if the operating system used with the computer 10 is an incompatible OS, the install program according to the embodiment attempts to access the database server 15 on the network based on the location information recorded on the recording medium (namely, the CD-ROM 1). Then, the install program causes the computer 10 to determine whether or not the software recorded on the recording medium (CD-ROM 1) can be installed based on the installation information stored in the database server 15. Before accessing the database server 15, the install program of the embodiment causes the computer 10 to execute network connection confirmation processing of requesting the user to determine whether or not network connection to the database server 15 is to be made.

In the example in FIG. 5, if determination of NO is made at S110, information as shown in FIG. 6 is displayed on a display screen 12 of a monitor at S120, prompting the user to make a selection. If the user permits network connection (namely, selects YES in FIG. 6) in the network connection confirmation processing, determination of YES is made at S120; if the user does not permit network connection (namely, selects NO in FIG. 6), determination of NO is made at S120. As the network connection confirmation processing is thus performed before the determination processing, user's intention can be confirmed and it is made possible to reflect the intention of the user who does not want to connect the computer to the database server 15 (for example, the user wants to suppress a delay caused by performing unnecessary processing because of insufficient network connection environment or the user is insecure about the network security).

If the determination at S120 is YES, connection check processing of checking whether or not connection to specific URL can be made (S130), existence check processing of checking whether or not installation information exists in the database server 15 (S140), and server support check processing of checking whether or not the OS of the computer 10 can be supported according to the installation information stored in the database server 15 (S150) are executed. First, the connection check processing is executed at S130. In the connection check processing, if the specific URL specified by the location information can be accessed, it is determined that connection can be made (YES at S130); if the specific URL cannot be accessed (for example, if the line is blocked for a physical reason), it is determined that connection cannot be made (NO at S130). If it is determined that connection cannot be made, it is determined that the software cannot be installed in the computer 10, and S240 (described later) is executed.

When the specific URL is accessed, the existence check processing of checking whether or not installation information exists in the database server 15 is executed at S140. The installation information contains instruction information concerning installation (instruction data, instruction program, etc.), and makes possible data reference or data acquisition based on the install program recorded on the recording medium. In the embodiment, the installation information is formed as shown in FIG. 8. If such installation information exists in the database server 15, the determination at S140 is YES; if such installation information does not exist in the database server 15, the determination at S140 is NO and it is determined that the software cannot be installed in the computer 10. Then, S240 (described later) is executed.

After the database server 15 is accessed, if it is determined that the installation information as shown in FIG. 8 exists in the database server 15, the compatible OS version information contained in the installation information is checked and whether or not the OS of the computer 10 can be supported according to the installation information is checked based on the compatible OS version information and the version information acquired by executing the OS version acquisition processing as the server support check processing at S150. As well as the compatible OS information recorded on the recording medium, the compatible OS information recorded in the database server 15 may be information capable of determining the OSs that can be supported according to the installation information; it may be a part of program code, etc., or may be provided as a list of compatible (supportable) OSs. In the example in FIG. 8A, the installation information is formed so as to contain instruction information for instructing the computer 10 to perform what processing for each OS version. At S150, whether or not the OS version of the computer 10 is OS version in which such instruction information is contained is determined.

If the OS of the computer 10 is a compatible OS that can be supported according to the installation information, the determination at S150 is YES and the process goes to S160 at which the instruction information corresponding to the OS version, contained in the installation information is acquired. On the other hand, if the OS of the computer 10 is an OS that cannot be supported according to the installation information, the determination at S150 is NO and it is determined that the software cannot be installed in the computer 10. Then, S240 (described later) is executed. As shown in FIG. 8A, the installation information can be formed so as to contain substitute instruction information for giving an instruction to substitute already existing information, cancel instruction information for giving a cancel instruction, a download instruction information for giving an instruction to download data, etc.

In FIG. 8A, substitute instruction information is applied to the OS corresponding to "OS1 Ver5.0," giving an instruction to substitute operation information and software in "OS1 Ver4.0" recorded on the recording medium if the OS version of the computer 10 is "OS1 Ver5.0." Cancel instruction information is applied to the OS corresponding to "OS1 Ver5.1," giving an instruction to cancel installing the software if the OS version of the computer 10 is "OS1 Ver5.1." Further, download instruction information is applied if the OS version of the computer 10 is "OS1 Ver5.2;" it gives an instruction to download data from the specific address (here, URL3).

S170 to S190 are steps based on such instruction information. In step S170, whether or not the OS of the computer 10 is unsupported is determined. If the OS of the computer 10 is unsupported, namely, if the OS is an OS to which a cancel instruction is applied as with "OS1 Ver5.1" shown in FIG. 8A, the determination at S170 is YES; otherwise, the determination at S170 is NO and the process goes to S180. If cancel instruction information is applied as at S170, it is determined in the determination processing that the software cannot be installed in the computer 10, and cancel processing to cancel installing the software in the computer 10 is executed. If the OS of the computer 10 can be supported with substitute information recorded on the recording medium, namely, is like "OS1 Ver5.0" shown in FIG. 8A, the determination at S180 is YES and the process goes to S230 at which installation processing is executed with the substitute information recorded on the recording medium (namely, installation processing is executed assuming that it is determined in the determination processing that the software can be installed in the computer 10).

If the determination at S180 is NO, whether or not a compatible version exists on the Web is checked at S190. If download instruction information is applied as with "OS1 Ver5.2" shown in FIG. 8A, the computer 10 is connected to the specified URL and data (both or either of operation information and software) is downloaded at S200. That is, the installation program causes the computer 10 to execute download processing of downloading new software corresponding to the OS version information acquired by executing the OS version acquisition processing or operation information for installing the software recorded on the recording medium using the Web from the database server 15 or a server associated with the database server 15. Then, the installation program causes the computer 10 to execute download information use processing (also called download information use installation processing) of installing the software recorded on the recording medium based on the software or the operation information downloaded in the download processing.

Figure 4A:
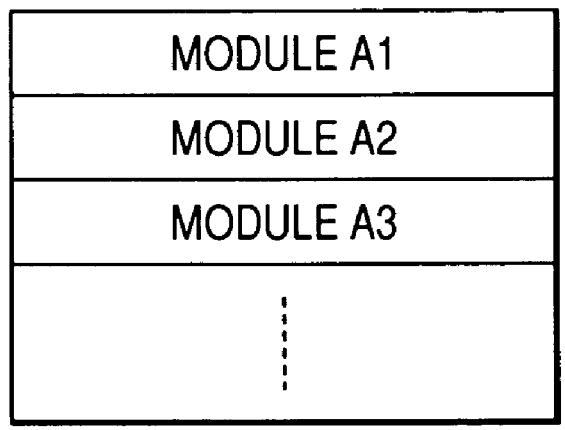
FIGS. 4A and 4B are conceptual drawings to conceptually show the software configuration and the operation information structure.
Figure 4B:
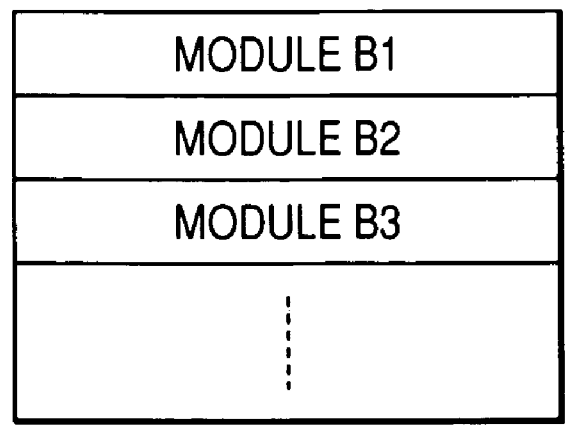

The information downloaded in the download processing may be the whole program forming the operation information or the software or may be some program module or data. For example, as shown in FIG. 4, when the software or the operation information recorded on the recording medium as for the software or the operation information for one OS is made up of several modules, if some module is changed, if the software or the operation information can also be applied to another OS, the module may be downloaded. In this case, some module is downloaded by executing the download processing and the software recorded on the recording medium can be installed using the downloaded module and the already existing program data recorded on the recording medium. In this case, for example, as shown in FIG. 8B, instruction information for giving an instruction to download some file into a predetermined folder can be stored as installation information. For example, an instruction to copy [File 1] into WINDIR folder is given in the upper portion of FIG. 8B. If operation information (for example, already existing operation information or downloaded operation information) is formed so as to install the software recorded on the recording medium using the copied file, it is made possible to install the software with only some file added or rewritten.

If the software cannot be installed (YES at S170 or NO at S190), the process goes to S210 and whether or not a display page for the user exists is checked. If a display page exists, the process goes to S220 and the display page is downloaded and is displayed. At S220, information responsive to the processing may be displayed. For example, if the OS is unsupported (YES at S170), a comment "compatible version will be provided in May" or the like can be displayed. If the software is installed based on the downloaded information, a download completion comment "download installation is complete" or the like can be displayed.

In the embodiment, the process of steps S110, S130 to S150, and S170 to S190 correspond to determination processing. If it is determined in the determination processing that the software can be installed in the computer 10 (namely, YES at S110 or YES at S180), the installation program causes the computer 10 to execute installation processing of installing the software recorded on the CD-ROM 1 at S230. If it is determined in the determination processing that the software cannot be installed in the computer 10 (NO at S130 to S150, YES at S170, or NO at S190), notification processing of notifying the user that the software cannot be installed in the computer 10 can be executed. In the embodiment, the notification processing can be performed at S220 and S240.

In the notification processing, various pieces of information can be used to notify the user. In the embodiment, as an example, information as shown in FIG. 7 is displayed at S240. Here, the user is notified that the CD-ROM 1 is not compatible with the OS of the computer used by the user, and the OSs compatible with the CD-ROM 1 are also displayed. In addition, information for prompting the user to access specific URL is displayed and if the user selects a link button, a specific site (for example, the site of the manufacturer providing the CD-ROM) can be accessed.

Second Embodiment

Next, a second embodiment of the invention will be discussed with reference to FIG. 9.

The processing flow shown in FIG. 9 is similar to that previously described with referenced to FIG. 5; they differ in that S120 and S130 are omitted and that after download processing is performed at S390, installation processing is performed at S400 and displaying a display page is omitted. Other steps are almost similar to those of the first embodiment; S300 and S310 correspond to S100 and S110 in FIG. 5 and S330 to S380 correspond to S140 to S190. S410, S420, and S440 correspond to S210, S230, and S240.

In the second embodiment, if it is determined at S380 that a compatible version exists on the Web, download processing of downloading software or operation information is performed at S390. At S400, automatic installation processing is performed using the downloaded information and the installation operation is completed without displaying a display page.

Third Embodiment

Next, a third embodiment of the invention will be discussed with reference to FIG. 10.

The third embodiment differs from the first and second embodiments in that a database server 15 on a network is accessed before software is installed.

The characteristics of the third embodiment are as follows: First, OS version acquisition processing as described above is performed and then network connection processing of accessing the database server 15 (FIG. 1, etc.) on the network based on location information recorded on a recording medium (CD-ROM 1) is performed before installation processing is executed. Whether or not the software recorded on the recording medium can be installed is determined based on the compatible OS version information stored in the database server 15 and the version information acquired by executing the OS version acquisition processing as determination processing. If it is determined in the determination processing that the software can be installed, installation processing of installing the software recorded on the recording medium is executed.

A specific processing flow is as follows:

An installation program of the embodiment causes a computer 10 (FIG. 1, etc.) to execute the OS version acquisition processing described in the first embodiment at S500 and then checks whether or not the installation program is set to URL connection mode at S510. The installation program can be switched between the URL connection mode and non-connection mode, for example, as the design of only a predetermined module is changed so that the installation program can be easily switched in design between the URL connection mode and non-connection mode. S510 can also be skipped.

If the installation program is set to the URL connection mode, the user is requested to specify whether or not the computer 10 is to be connected to URL (for example, display information is displayed for prompting the user to make a selection) at S520. If the user responds with NO, the determination at S520 is NO and the process goes to S660 at which whether or not the OS of the computer 10 is an OS for enabling the software to be installed in the computer 10 is checked. If the OS enables the software to be installed in the computer 10 (namely, the software can be installed in the computer 10 only with the information in the recording medium (CD-ROM 1)), installation processing is executed at S670. On the other hand, if it is determined at S660 that the OS does not enable the software to be installed in the computer 10, the process goes to S680 and notification processing is executed (here, a message indicating that the install program stored on the recording medium does not support the OS of the computer 10 is displayed at S680).

On the other hand, if the user responds with YES at S520, the process goes to S530. S530 is connection check processing as at S130 in FIG. 5. S540 is existence check processing as at S140. If the determinations at S530 and S540 are NO, the process goes to S660. Further, if it is determined that installation information as shown in FIG. 8 exists, the compatible OS information contained in the installation information is checked and whether or not the OS of the computer 10 can be supported according to the installation information is checked based on the compatible OS information and the version information acquired by executing the OS version acquisition processing as the server support check processing at S550. If the OS of the computer 10 can be supported, the determination at S550 is YES and the process goes to S560 at which instruction information corresponding to the version contained in the installation information is acquired.

In the embodiment, whether or not the OS of the computer 10 is unsupported and whether or not a compatible version exists on the Web are determined based on the compatible OS information (S570 and S590) as at S170 and SS190 in the first embodiment. If the determinations are YES, the later process flow is similar to that in the first embodiment (S600, S640, S650). On the other hand, when the information recorded on the recording medium (CD-ROM 1) can be used (namely, YES at S580), if the database server 15 contains newer information than information recorded on the recording medium (CD-ROM 1) about software corresponding to the OS version information acquired by executing the OS version acquisition processing or operation information for installing the software, it is determined that the software cannot be installed, and the computer 10 is caused to execute download processing of downloading the new software or the new operation information from the database server 15.

Specifically, if it is determined at S580 that the information recorded on the recording medium (CD-ROM 1) can be used, whether or not version update installation is set, namely, whether or not the install program is set so as to update the contents of the recording medium is checked (S610). If version update installation is set, whether or not a compatible version exists on the Web is checked by referencing the installation information (S620). If a compatible version exists on the Web, namely, if version update information of the software or the operation information to be used to install the software exists on the Web, the user is requested to specify whether or not the version update information is to be downloaded to install the software (S630). In this case, display information for enabling the user to selectively enter YES or NO can be displayed, prompting the user to enter YES or NO. If the user responds with YES, the process goes to S600 and download information use processing (download information use installation processing) is executed. If the determination at any of S610 to S630 is NO, the version update information is not downloaded and the software is installed using the already existing information recorded on the recording medium (S670).

Other Embodiments

It is to be understood that the invention is not limited to the embodiments described with reference to the accompanying drawings, that the following embodiments, for example, are also contained in the scope of the invention, and that various changes and modifications may be made without departing from the spirit and scope of the invention.

(1) In the embodiments described above, a printer driver or a scanner driver is illustrated as the software, but the software may be any arbitrary software. For example, the software may be a driver for communication equipments such as a modem or a router or may be a driver of an input device such as a mouse or a keyboard or an output device such as a display.

The software is not limited to drivers for causing devices to function, the devices that are externally connected to a computer, and may be software for various purposes such as document processing and drawing.

(2) In the embodiments described above, the database server may be provided by a single computer connected to the network or may be a system wherein a plurality of computers are connected so that they can conduct information communications with each other and function on the network in association with each other.

(3) In the embodiments described above, the install program for installing the driver is illustrated and specifically the install program recorded on the recording medium provided separately from the apparatus to be driven (printer or scanner) is shown. However, to install the driver for driving such an apparatus, the recording medium storing the install program may be placed in the apparatus to be driven. For example, to install the driver of a printer or a scanner as shown in FIG. 2, the recording medium recording the install program may be placed in memory 17A in the printer (for example, recording medium such as ROM) or memory 19A in the scanner (recording medium such as ROM) and the information recorded in the memory may be read by the computer 10 for use.

Advantages of the Embodiments

As described above, According to the embodiments described above, for the compatible OS that can be supported only with the information recorded on the recording medium, rapid measures can be taken based on the contents of the recording medium. On the other hand, for the incompatible OS that cannot be supported (for example, OS provided after the recording medium is released), whether or not the software can be installed in the computer can be determined based on the installation information stored in the database server and consequently, appropriate processing with no problem is made possible.

In the embodiments described above, before the software is installed, the information stored in the database server can be checked preferentially based on the acquired version information. Therefore, if useful information concerning installation is stored in the database server, the information can be preferentially reflected for performing processing.

In the embodiments described above, when it is determined that the software cannot be installed in the computer, new software or operation information corresponding to the OS of the computer can be used. Therefore, even if the OS cannot be supported only with the information recorded on the recording medium, it is not necessary to cancel installing the software or use a program whose operation is not guaranteed, and the software can be installed appropriately based on new downloaded information.

According to the embodiments described above, if the database server contains newer information than information recorded on the recording medium about the software corresponding to the operating system version information or operation information for installing the software, the new software or the new operation information is downloaded from the database server. Therefore, if the database server is updated with new information, the information can be used preferentially and still more appropriate processing is made possible. Specifically, for example, when the program at the product release time contained bugs, if a new program from which the bugs have been eliminated is stored in the database server as update information, processing with no problem is made possible using the update information.

In the embodiments described above, when it is determined that the software cannot be installed in the computer, software or operation information is downloaded and the software is installed based on the downloaded software or operation information, so that the number of steps to be executed by the user when the software cannot be installed can be lessened and therefore the load on the user can be decreased effectively.

According to the embodiments described above, the user can reliably grasp the fact that it is determined that the software cannot be installed in the computer.

According to the embodiments described above, even if a state in which connection to the database server cannot be made occurs, it does not become impossible to make a determination and consequently appropriate measures can be taken with no problem.

According to the embodiments described above, when it is determined in the determination processing that the software cannot be installed in the computer, installing the software is canceled. Therefore, if measures cannot be taken with the information in the recording medium, installing the software is canceled through the determination processing rather than canceled evenly. Thus, it is made possible to appropriately cancel installing the software.

According to the embodiments described above, when installing a printer driver or a scanner driver highly dependent on the operating system, it is made possible to take appropriate measures considering the operating system.

According to the embodiments described above, there is provided a recording medium that can be distributed as a tangible product for providing similar advantages to those of the install program as described above.

According to the embodiments described above, there is provided an installation method for providing similar advantages to those of the install program described above.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A tangible software install program product for installing a software program recorded on a non-transitory computer-readable recording medium into a computer that is separate from the computer-readable recording medium, the program product causing the computer to execute:

acquiring version information of an operating system used with the computer;

acquiring, from the recording medium, compatible operating system information of the software program stored in the recording medium;

determining whether or not the operating system is a compatible operating system corresponding to the compatible operating system information based on the compatible operating system information and the version information;

if determined that the operating system is a compatible operating system, then determining that the software program can be installed in the computer;

if determined, from the compatible operating system information acquired from the recording medium, that the operating system is not a compatible operating system, then:

acquiring location information stored in the recording medium;

accessing a database server on a network based on the location information;

acquiring additional compatible operating system information stored in the database server; and determining whether or not the software program stored in the recording medium can be installed in the computer based on the additional compatible operating system information; and installing the software program stored in the recording medium into the computer if determined that the software program can be installed in the computer.

2. The program product according to claim 1, further causing the computer to execute downloading from the database server a new software program corresponding to the version information of the operating system or operation information for installing the software program, if determined that the software program cannot be installed into the computer.

3. The program product according to claim 2, further causing the computer to execute installing the software program using the new software program or the operation information.

4. The program product according to claim 1, further causing the computer to execute notifying a user that the software program cannot be installed into the computer, if determined that the software program cannot be installed into the computer.

5. The program product according to claim 1, further causing the computer to execute determining that the software program cannot be installed into the computer, if the installation information cannot be referenced.

6. The program product according to claim 1, further causing the computer to execute canceling the installation of the software program, if determined that the software program cannot be installed into the computer.

7. The program product according to claim 1, wherein the software program includes a printer driver or a scanner driver.

8. The program product according to claim 1, wherein the program product is recorded in the recording medium.

9. An computer-implemented installation method for installing a software program recorded on a computer-readable recording medium into a computer that is separate from the computer-readable recording medium according to an install program recorded on the computer-readable recording medium, the installation method comprising:

acquiring version information of an operating system used with the computer;

acquiring, from the recording medium, compatible operating system information of the software program stored in the recording medium;

determining whether or not the operating system is a compatible operating system corresponding to the compatible operating system information based on the compatible operating system information and the version information;

if determined that the operating system is a compatible operating system, then determining that the software program can be installed in the computer;

if determined, from the compatible operating system information acquired from the recording medium, that the operating system is not a compatible operating system, then:

acquiring location information stored in the recording medium;

accessing a database server on a network based on the location information;

acquiring additional compatible operating system information stored in the database server; and determining whether or not the software program stored in the recording medium can be installed in the computer based on the additional compatible operating system information; and installing the software program stored in the recording medium into the computer if determined that the software program can be installed in the computer.

10. A software install system that installs a software program recorded on a non-transitory computer-readable recording medium into a computer that is separate from the computer-readable recording medium, the software install system comprising:

a processor coupled to a memory;

an operating system version acquisition unit that acquires version information of an operating system used with the computer;

a compatible operating system information acquisition unit that acquires, from the recording medium, compatible operating system information of the software program stored in the recording medium;

a compatibility check unit that determines whether or not the operating system is a compatible operating system corresponding to the compatible operating system information based on the compatible operating system information and the version information, wherein:

if determined by the compatibility check unit that the operating system is a compatible operating system, then determining that the software program can be installed in the computer;

if determined by the compatibility check unit, from the compatible operating system information acquired from the recording medium, that the operating system is not a compatible operating system, then:

invoking a location information acquisition unit that acquires location information stored in the recording medium;

invoking a communication unit that accesses a database server on a network based on the location information and that acquires additional compatible operating system information stored in the database server; and determining whether or not the software program stored in the recording medium can be installed in the computer based on the additional compatible operating system information; and an installation unit that installs the software program stored in the recording medium into the computer if determined that the software program can be installed in the computer.

* * * * *